US008516110B2

(12) United States Patent
Aguiar et al.

(10) Patent No.: US 8,516,110 B2
(45) Date of Patent: Aug. 20, 2013

(54) AUTOMATED AVAILABILITY DATA COLLECTION AND REPORTING FOR SYSTEM MANAGEMENT ENVIRONMENTS

(75) Inventors: Murio G. Aguiar, Sao Paulo (BR);
Guilherme S. Elias, Sao Paulo (BR);
Lucas G. Franco, Sao Paulo (BR);
Marcos V. L. Paraiso, Sao Paulo (BR);
Marcos de Castro Sylos, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/216,608

(22) Filed: Aug. 24, 2011

(65) Prior Publication Data
US 2013/0054777 A1  Feb. 28, 2013

(51) Int. Cl.
*G06F 15/16* (2006.01)

(52) U.S. Cl.
USPC ............ 709/224; 709/203; 709/223; 348/207

(58) Field of Classification Search
USPC .......................... 709/203, 223, 224; 348/207
See application file for complete search history.

(56) References Cited

U.S. PATENT DOCUMENTS

| 7,023,979 | B1 * | 4/2006 | Wu et al. .................. 379/265.11 |
| 7,069,184 | B1 | 6/2006 | Bargar et al. |
| 7,079,010 | B2 | 7/2006 | Champlin |
| 7,603,674 | B2 | 10/2009 | Cyr et al. |
| 7,822,844 | B2 | 10/2010 | Oulu et al. |
| 8,200,800 | B2 * | 6/2012 | Bolan et al. .................... 709/223 |
| 2002/0062249 | A1 * | 5/2002 | Iannacci ......................... 705/14 |
| 2003/0154108 | A1 * | 8/2003 | Fletcher-Haynes et al. ...... 705/3 |
| 2004/0010716 | A1 | 1/2004 | Childress et al. |
| 2006/0012683 | A9 * | 1/2006 | Lao et al. ................. 348/207.99 |
| 2009/0106605 | A1 | 4/2009 | Kuchibhotla et al. |
| 2009/0227363 | A1 * | 9/2009 | Kelly et al. ..................... 463/25 |
| 2010/0106678 | A1 | 4/2010 | Pietrek et al. |
| 2010/0217837 | A1 * | 8/2010 | Ansari et al. .................. 709/218 |
| 2010/0235484 | A1 * | 9/2010 | Bolan et al. .................. 709/223 |
| 2011/0202591 | A1 * | 8/2011 | Reis et al. ..................... 709/203 |

OTHER PUBLICATIONS

IBM Tivoli Monitoring solutions for performance and availability, A technical discussion of performance and availability, Dec. 2002, 12 pages.

* cited by examiner

*Primary Examiner* — Quang N Nguyen
*Assistant Examiner* — Tesfay Yohannes
(74) *Attorney, Agent, or Firm* — Schmeiser, Olsen & Watts, LLP; John Pivnichny

(57) ABSTRACT

A system and associated method for automatically monitoring and reporting availability data of at least one system management (SM) environment. A SM environment subject to monitoring is coupled to a SM portal server. The SM portal server has components of a central repository storing monitoring data, a user interface interacting with a user of the SM portal server, and a data collection module remotely controlling operations of availability module running in a monitoring server of the SM environment. The availability module gathers status of terminal systems of the SM environment by use of various SM tools and subsequently reports to the data collection module, which stores gathered data in the central repository and communicates to the user for availability analysis purposes.

20 Claims, 10 Drawing Sheets

AUTOMATED AVAILABILITY DATA COLLECTION AND REPORTING FOR SYSTEM MANAGEMENT ENVIRONMENTS

BACKGROUND

Conventional system management technologies use a single point of control and system status data collection for multiple computer systems in a system management (SM) environment. Consequently, conventional systems management technologies cannot automatically manage and monitor multiple SM environments.

BRIEF SUMMARY

According to one embodiment of the present invention, a method for automatically monitoring and reporting availability data of at least one system management (SM) environment comprises: identifying a SM environment of said at least one SM environment that is eligible for data collection, wherein the SM environment is coupled to a SM portal server, wherein the SM portal server comprises a central repository, a user interface, and a data collection module, wherein the SM environment comprises a monitoring server and one or more terminal systems coupled to the monitoring server, and wherein the monitoring server runs an availability module that enables collecting of various system level data from said one or more terminal systems; retrieving connection configuration associated with the identified SM environment from the central repository; collecting the availability data from the availability module upon determining that the retrieved connection configuration properly establishes communication between the SM portal server and the identified SM environment, wherein the availability data represents availability of resources of said one or more terminal systems; recording the collected availability data and a transaction log of said collecting in the central repository; and communicating content of the central repository from said recording such that a user of the SM portal server utilizes contents of the central repository in analyzing availability of the resources in the SM environment.

According to one embodiment of the present invention, a computer program product comprises a computer readable memory unit that embodies a computer readable program code. The computer readable program code contains instructions that, when run by a processor of a computer system, implement a method for automatically monitoring and reporting availability data of at least one SM environment.

According to one embodiment of the present invention, a computer system comprises a processor, a memory coupled to the processor, and a computer readable storage device coupled to the processor, said storage device containing program code configured to be executed by the processor via the memory to implement a method for automatically monitoring and reporting availability data of at least one SM environment.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for automatically monitoring and reporting availability data of at least one SM environment.

BRIEF DESCRIPTION OF THE SEVERAL VIEWS OF THE DRAWINGS

FIG. 8 is an example of a screen display implementing the web-based graphical user interface (GUI) of the SMPS of FIG. 2, in accordance with embodiments of the present invention.

FIG. 9 is an example of a detailed status report generated by the data collection module running in the SMPS of FIG. 2, in accordance with embodiments of the present invention.

DETAILED DESCRIPTION

Figure 1:
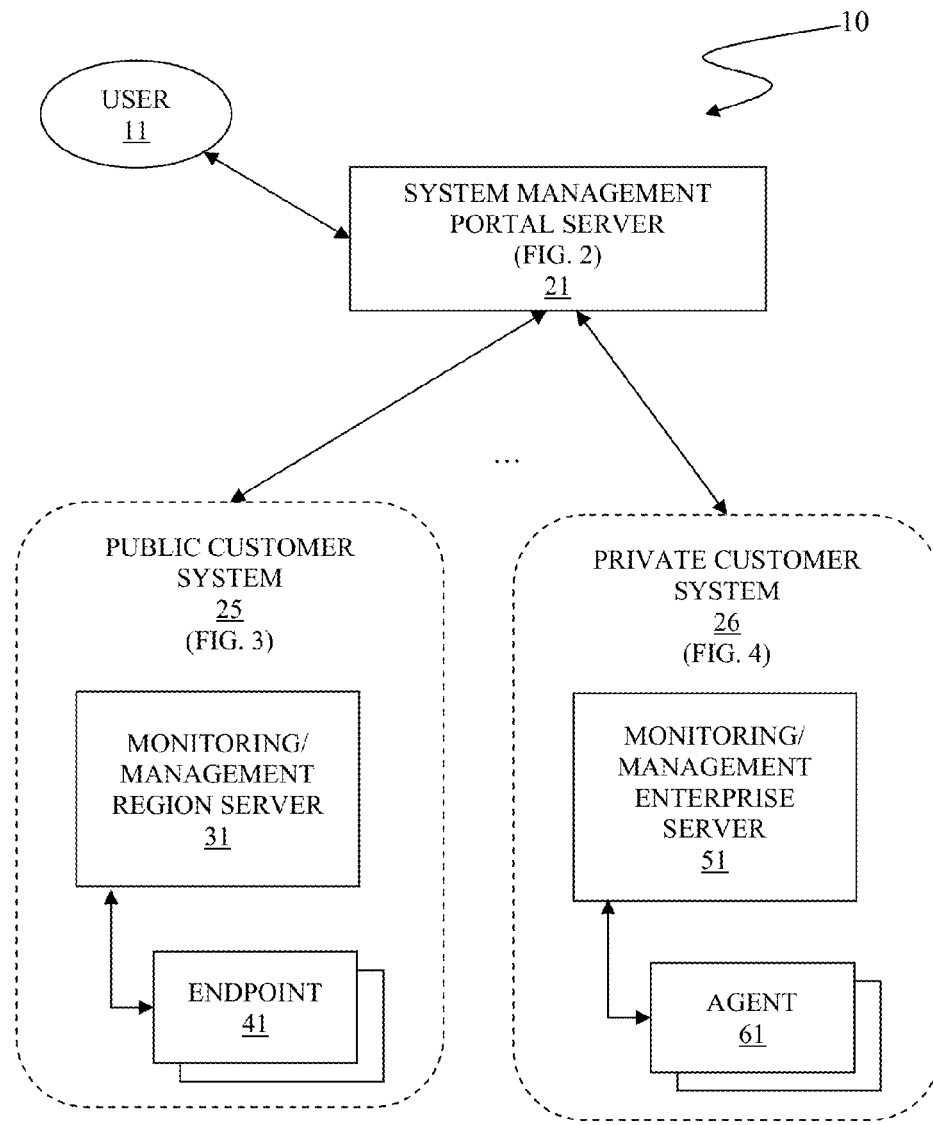
FIG. 1 illustrates a system 10 for automatically monitoring and reporting availability data of respective system management environments, in accordance with embodiments of the present invention.

FIG. 1 illustrates a system 10 for automatically monitoring and reporting availability data of respective system management environments, in accordance with embodiments of the present invention.

The system 10 comprises a user 11, a system management portal server 21, and one or more customer systems. In this specification, terms "system management (SM) environment" and "customer system" are used interchangeably to indicate a digital communication network interconnecting two or more computer systems subject to said automatic monitoring and reporting.

A public customer system 25 of said one or more customer systems is a first customer system wherein components are interconnected via a public network environment. The public customer system 25 comprises a monitoring/management region server 31 and at least one endpoint respectively coupled to the monitoring/management region server 31. A private customer system 26 of said one or more customer systems is a second customer system wherein components are interconnected via a private network environment. The private customer system 26 comprises a monitoring/management enterprise server 51 and at least one agent respectively coupled to the monitoring/management enterprise server 51.

The user 11 is a human user administering the system management portal server 21 providing inputs comprising control data and receiving outputs comprising reports to and from the system management portal server 21, respectively. In one embodiment of the present invention, the user 11 interacts with the system management portal server 21 by use of web-based graphical user interface (GUI). The inputs of the control data dictate automatic monitoring and reporting operations for the system availability data performed by the system management portal server 21 and respective servers of the customer systems. The inputs of the reports comprise information on current and historical status of the system management portal server 21, and information on current and historical status of respective components of all customer systems coupled to the system management portal server 21. In this specification, terms "availability data" and "system availability data" are used interchangeably to define a percentile value representing a ratio of available system resources to total system resources.

The system management portal server 21 automatically collects and subsequently consolidates, analyzes and stores system availability data from respective servers of the customer systems. The system management portal server 21 interacts with the user 11 by receiving inputs from the user 11 and by returning outputs to the user 11 as being generated by components of the customer systems, 25 and 26. The system management portal server 21 enables the user 11 to interact with the customer systems, 25 and 26, in controlling operations of respective servers and in receiving status reports from the respective servers of the customer systems, 25 and 26. See descriptions of FIG. 2 infra for details for components of the system management portal server 21.

The monitoring/management region server 31 of the public customer system 25 performs automatic monitoring for availability data of said at least one endpoint in the public customer system 25. In one embodiment of the present invention, the monitoring/management region server 31 is implemented by use of IBM® Tivoli® Management Region (TMR) Server, which may run in various operating systems (IBM and Tivoli are registered trademarks of International Business Machines Corporation in the United States and other countries). Examples of the operating systems in which the IBM TMR server runs may be, inter alia, Linux®, AIX®, Solaris®, HP-UX®, Windows™ etc. (Linux is a registered trademark of Linus Torvalds in the United States; AIX is a registered trademark of IBM Corporation, in the United States and other countries; Solaris is a registered trademark of Sun Microsystems, Inc., in the United States and other countries; HP-UX is a registered trademark of Hewlett-Packard Company in the United States and other countries; and Windows is a trademark of Microsoft Corporation, in the United States and other countries.)

In the public customer system 25, an endpoint A 41A of said at least one endpoint is coupled to the monitoring/management region server 31. The endpoint 41 is a client program deployed on terminal systems of the public customer system 25 in order to provide availability data to the monitoring/management region server 31 in performing automatic monitoring and reporting. In one embodiment of the present invention, the endpoint 41 is implemented by use of IBM Tivoli Endpoint, wherein the monitoring/management region server 31 is implemented by use of IBM Tivoli Management Region (TMR) Server. The endpoint A 41A may run on various operating systems. Examples of the operating systems in which the IBM Tivoli Endpoint runs may be, inter alia, Linux, AIX, Solaris, HP-UX, Windows, etc. See description of FIG. 3 infra for an example of the public customer system 25.

The monitoring/management enterprise server 51 of the private customer system 26 performs automatic monitoring for availability data of said at least one agent in the private customer system 26. In one embodiment of the present invention, the monitoring/management enterprise server 51 is implemented by use of IBM Tivoli Enterprise Portal Server (TEPS), which may run in AIX operating system.

In the private customer system 26, an agent 61 of said at least one agent is coupled to the monitoring/management enterprise server 51. The agent 61 is another client program deployed on terminal systems of the private customer system 26 in order to provide availability data to the monitoring/management enterprise server 51 in performing automatic monitoring and reporting. In one embodiment of the present invention, the agent 61 is implemented by use of IBM Tivoli Enterprise Monitoring Agent (TEMA), wherein the monitoring/management enterprise server 51 is implemented by use of IBM Tivoli Enterprise Monitoring Server (TEMS). The agent 61 may run on an operating system selected from Linux, AIX, Solaris, HP-UX, and Windows. See descriptions of FIG. 4 infra for an example of the private customer system 26. In this specification, the term "terminal systems" collectively indicates both endpoints coupled to monitoring/management region servers and agents coupled to monitoring/management enterprise servers.

Figure 2:
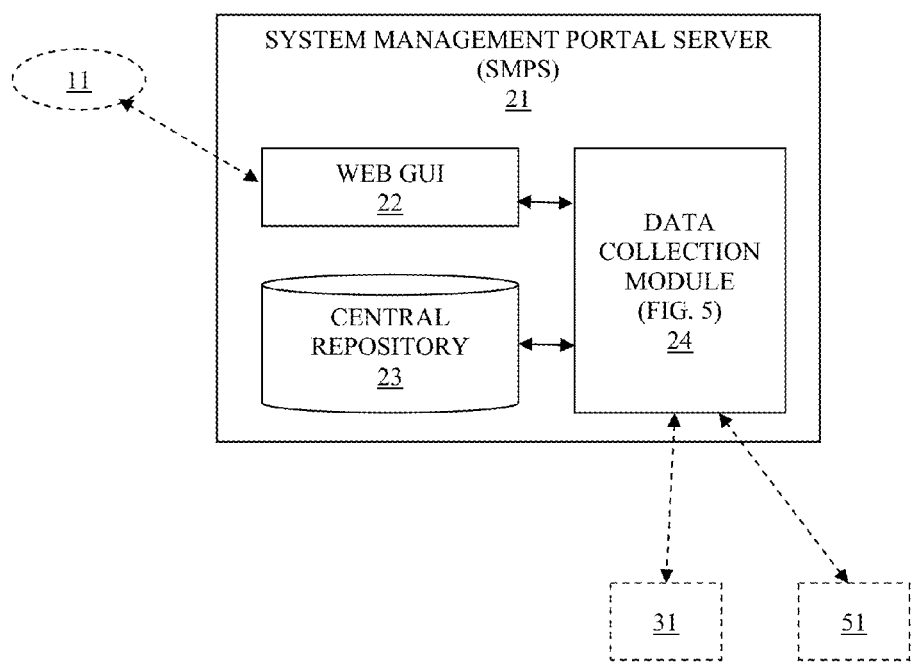
FIG. 2 illustrates the system management portal server (SMPS) 21 in the system 10 of FIG. 1, in accordance with the embodiments of the present invention.

FIG. 2 illustrates the system management portal server 21 in the system 10 of FIG. 1 supra, in accordance with the embodiments of the present invention.

The system management portal server (SMPS) 21 comprises a web-based graphical user interface (GUI) 22, a central repository 23, and a data collection module 24.

The SMPS 21 interacts with the user 11 by use of the web-based GUI 22, in receiving the control data from the user 11 and in displaying the reports to the user 11 resulting from operating the data collection module 24. Examples of the reports may be, inter alia, dynamic status reports, web charts, availability data trends, etc. See FIG. 8 infra for an example of the web-based GUI 22.

The central repository 23 of the SMPS 21 stores all availability data used by the data collection module 24 as being gathered from the customer systems and generated before, during, and after performing automatic monitoring and reporting of the availability data. In one embodiment of the present invention, data stored in the central repository 23 are used for, inter alia, a historical analysis for trends of the availability data, troubleshooting of terminal systems, etc.

The data collection module 24 connects to and orchestrates operations of availability modules running on respective servers of respective customer systems in collecting latest availability data from all terminal systems coupled to the SMPS 21. See description of FIG. 5 infra for operations performed by the data collection module 24.

Wherein the SMPS 21 monitors and manages terminal systems coupled to the monitoring/management region server 31, the data collection module 24 interacts with a regional availability module running in the monitoring/management region server 31 in the public customer system 25. See description of FIG. 3 infra for details of the regional availability module.

Wherein the SMPS 21 monitors and manages terminal systems coupled to the monitoring/management enterprise server 51, the data collection module 24 interacts with an enterprise availability module running in the monitoring/management enterprise server 51 in the private customer system 26. See description of FIG. 4 infra for details of the enterprise availability module.

Figure 3:
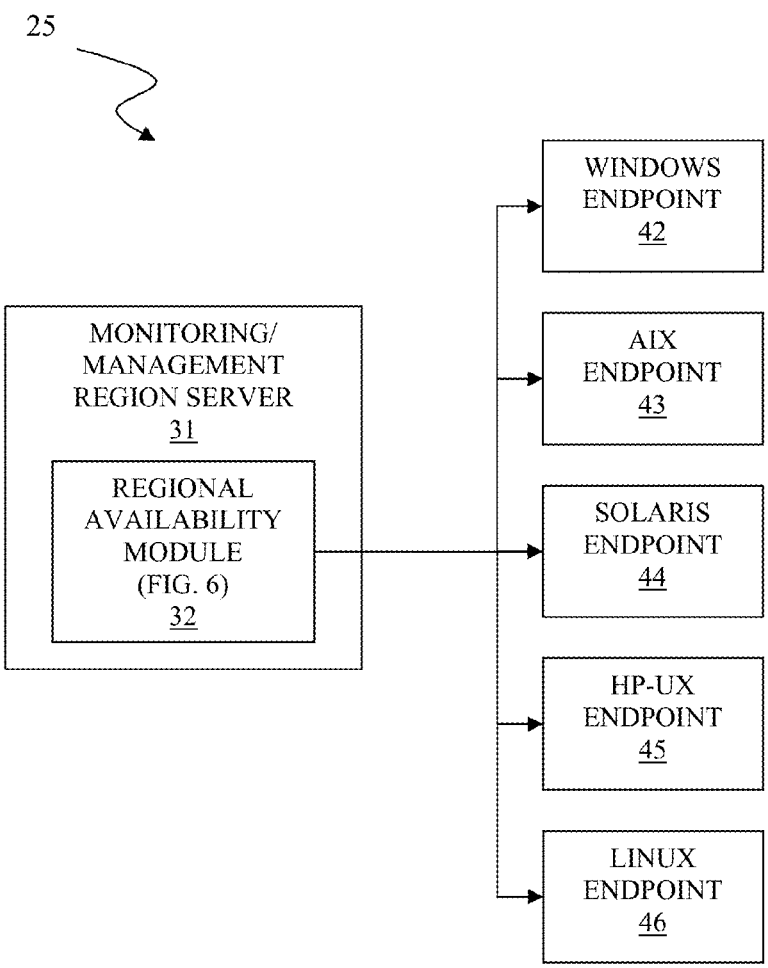
FIG. 3 illustrates components of the public customer system 25 in the system 10 of FIG. 1, wherein the components of the public customer system are coupled via a public network, in accordance with the embodiments of the present invention.

FIG. 3 illustrates components of the public customer system 25 in the system 10 of FIG. 1 supra, wherein the components of the public customer system are coupled via a public network, in accordance with the embodiments of the present invention.

The public customer system 25 further comprises a public system management environment comprising at least one computer system selected from the group consisting of a Windows endpoint 42, an AIX endpoint 43, a Solaris endpoint 44, a HP-UX endpoint 45, and a Linux endpoint 46, which are coupled to the monitoring/management region server 31 via the public network. The Windows endpoint 42 runs in a Windows server on a first computer system of the public customer system 25. The AIX endpoint 43 runs in an AIX server on a second computer system of the public customer system 25. The Solaris endpoint 44 runs in a Solaris server on a third computer system of the public customer system 25. The HP-UX endpoint 45 runs in a HP-UX server on a fourth computer system of the public customer system 25. The Linux endpoint 46 runs in a Linux server on a fifth computer system of the public customer system 25. In one embodiment of the present invention, each endpoint is respectively implemented as a respective Tivoli Endpoint installed in said respective server, and the respective Tivoli Endpoint is coupled to a Tivoli Region environment, which implements the monitoring/management region server 31.

The monitoring/management region server 31 performs system management service tasks for the public customer system 25. The monitoring/management region server 31 comprises a regional availability module 32, which collects availability data from above listed endpoints of the public customer system 25. See description of FIG. 6 infra for operations performed by the regional availability module 32. In one embodiment of the present invention, the regional availability module 32 runs on a system management environment based on specific client-server architecture, inter alia, Tivoli Framework, Tivoli Monitoring v6, and BMC® Patrol®. (BMC and Patrol are registered trademarks of BMC Software Inc., in the United States and other countries)

The regional availability module 32 is commonly referred to as "availability agents" that work as a client-side program interacting with a server-side program implemented as the system management portal server 21 of FIG. 1 supra. Various computer systems of the public system management environment interacts with the system management portal server 21 of FIG. 1 supra via the regional availability module 32 running on the monitoring/management region server 31 such that the monitoring/management region server 31 integrates said various computer systems into a single environment for system management by collecting data from each computer system of the public system management environment.

In one embodiment of the present invention, the regional availability module 32 is Tivoli Availability Agent that is installed on each Tivoli Management Region (TMR) Server, which is an example of the monitoring/management region server 31. In the same embodiment, the system management portal server 21 of FIG. 1 supra is implemented by Tivoli Framework Server.

Figure 4:
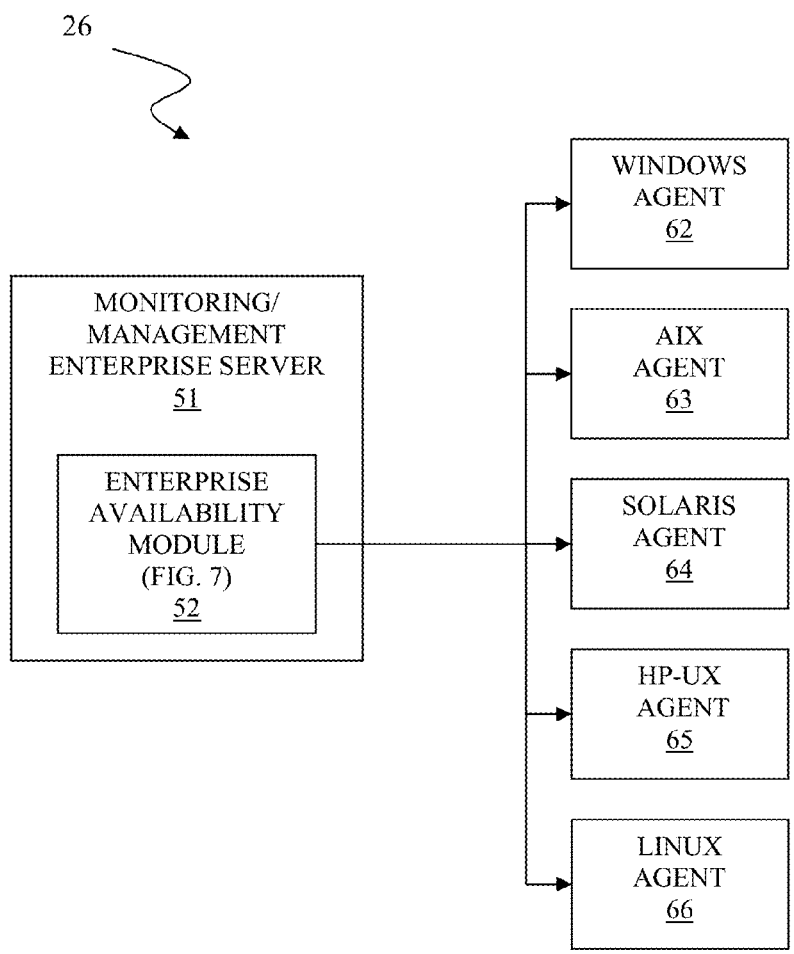
FIG. 4 illustrates components of the private customer system 26 in the system 10 of FIG. 1, wherein the components of the private customer system are coupled via a private network, in accordance with the embodiments of the present invention.

FIG. 4 illustrates components of the private customer system 26 in the system 10 of FIG. 1 supra, wherein the components of the private customer system are coupled via a private network, in accordance with the embodiments of the present invention.

The private customer system 26 further comprises a private system management environment comprising at least one computer system selected from the group consisting of a Windows agent 62, an AIX agent 63, a Solaris agent 64, a HP-UX agent 65, and a Linux agent 66, which are coupled to the monitoring/management enterprise server 51 via the private network. The Windows agent 62 runs in a Windows server on a first computer system of the private customer system 26. The AIX agent 63 runs in an AIX server on a second computer system of the private customer system 26. The Solaris agent 64 runs in a Solaris server on a third computer system of the private customer system 26. The HP-UX agent 65 runs in a HP-UX server on a fourth computer system of the private customer system 26. The Linux agent 66 runs in a Linux server on a fifth computer system of the private customer system 26. In one embodiment of the present invention, each agent is respectively implemented as a respective Tivoli Enterprise Monitoring Agent (TEMA) installed in said respective server, and the respective TEMA is coupled to a Tivoli Enterprise Monitoring Server (TEMS), which implements the monitoring/management enterprise server 51.

The monitoring/management enterprise server 51 performs system management service tasks for the private customer system 26. The monitoring/management enterprise server 51 comprises an enterprise availability module 52, which collects availability data from above listed agents of the private customer system 26. See description of FIG. 7 infra for operations performed by the enterprise availability module 52. In one embodiment of the present invention, the monitoring/management enterprise server 51 is a Tivoli Enterprise Portal Server (TEPS) that runs on a AIX Operating System. The enterprise availability module 52 runs on a system management environment based on specific client-server architecture, inter alia, Tivoli Framework, Tivoli Monitoring v6, and BMC® Patrol®. (BMC and Patrol are registered trademarks of BMC Software Inc., in the United States and other countries)

The enterprise availability module 52 operates as a client-side program interacting with a server-side program implemented as the system management portal server 21 of FIG. 1 supra. Various computer systems of the private system management environment interacts with the system management portal server 21 of FIG. 1 supra via the enterprise availability module 52 running on the monitoring/management enterprise server 51 such that the monitoring/management enterprise server 51 integrates said various computer systems into a single environment for system management by collecting data from each computer system of the private customer system 26.

Figure 5:
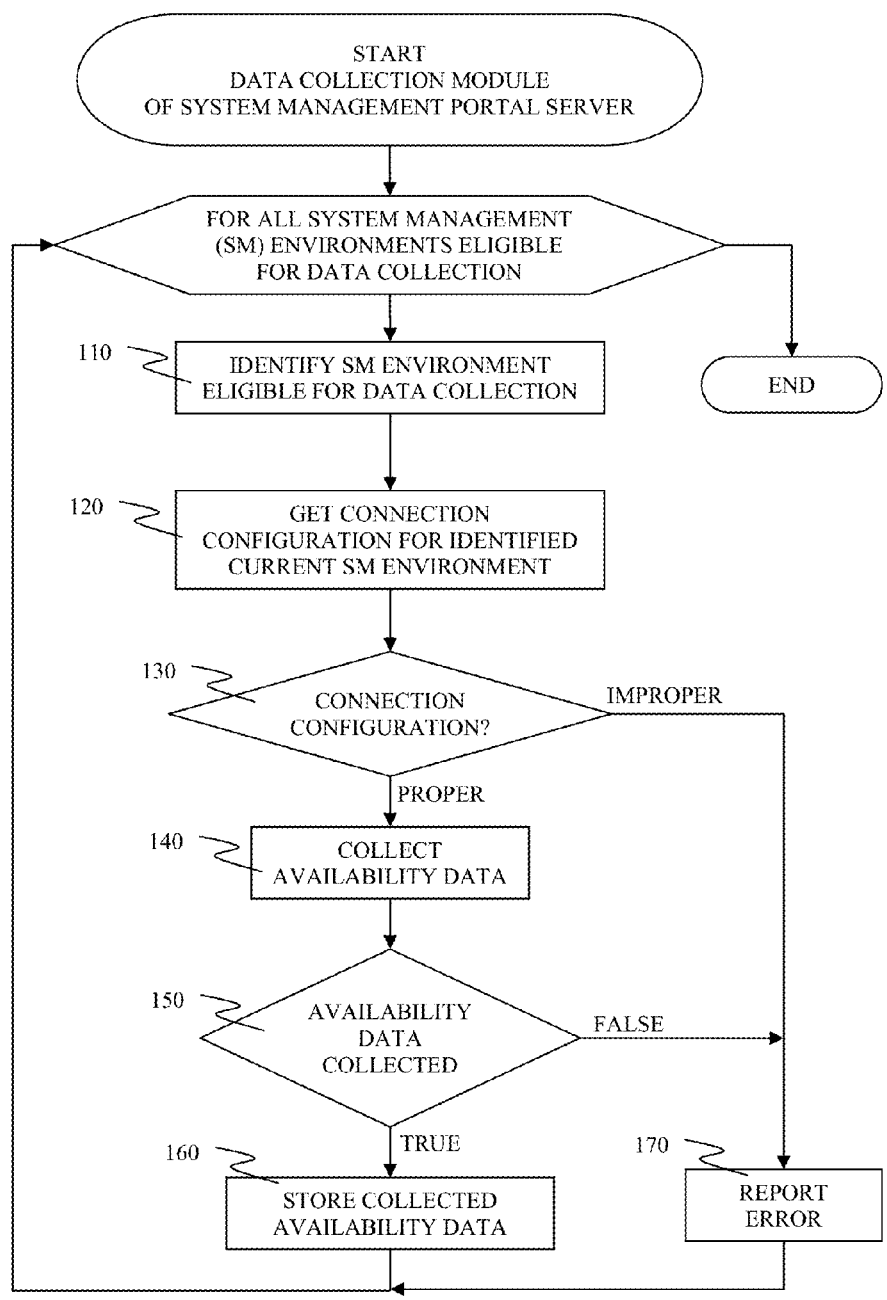
FIG. 5 is a flowchart depicting a method for automatically monitoring and reporting availability data of respective system management environments, which is performed by the data collection module in the SMPS of FIG. 2, in accordance with the embodiments of the present invention.

FIG. 5 is a flowchart depicting a method for automatically monitoring and reporting availability data of respective system management environments, which is performed by the data collection module in the system management portal server (SMPS) of FIG. 2 supra, in accordance with the embodiments of the present invention.

The data collection module is configured to integrate various system management (SM) environments coupled to the SMPS. The data collection module performs steps 110 through 170 respectively for each SM environment.

In step 110, the data collection module identifies a current SM environment that is eligible for availability data collection. Then the data collection module proceeds with step 120.

In step 120, the data collection module retrieves, from the central repository, configuration information of the current SM environment identified in step 110 supra, for connection between the SMPS and the respective monitoring/management server and subsequent availability data collection. Then the data collection module proceeds with step 130.

In step 130, the data collection module determines whether the configuration information retrieved in step 120 supra is proper for further data communication between the SMPS and the respective monitoring/management server of the current SM environment. If the data collection module determines that the configuration information is proper, then the data collection module proceeds with step 140. If the data collection module determines that the configuration information is improper, then the data collection module proceeds with step 170.

In step 140, the data collection module collects availability data from an availability module of the current SM environment. The availability module generates the availability data from terminal systems of the current SM environment by performing steps shown in FIGS. 6 and 7 infra. Then the data collection module proceeds with step 150.

In step 150, the data collection module checks validity of the availability data collected in step 140 supra. If the data collection module determines that the availability data is valid, then the data collection module proceeds with step 160. If the data collection module determines that the availability data is not valid, then the data collection module proceeds with step 170.

In step 160, the data collection module stores the valid availability data as determined in step 150 supra, as well as transaction records, in the central repository of the SMPS. Then the data collection module loops back to step 110 for a next SM environment.

In step 170, the data collection module reports a respective error pursuant to a respective preceding step. If the data collection module performs step 170 subsequent to step 130, the data collection module reports a first type of error of improper connection configuration. If the data collection module performs step 170 subsequent to step 150, the data collection module reports a second type of error of invalid availability data collected from availability modules. Then the data collection module loops back to step 110 for a next SM environment. The data collection module terminates upon collecting data from all SM environments coupled to the SMPS.

Figure 6:
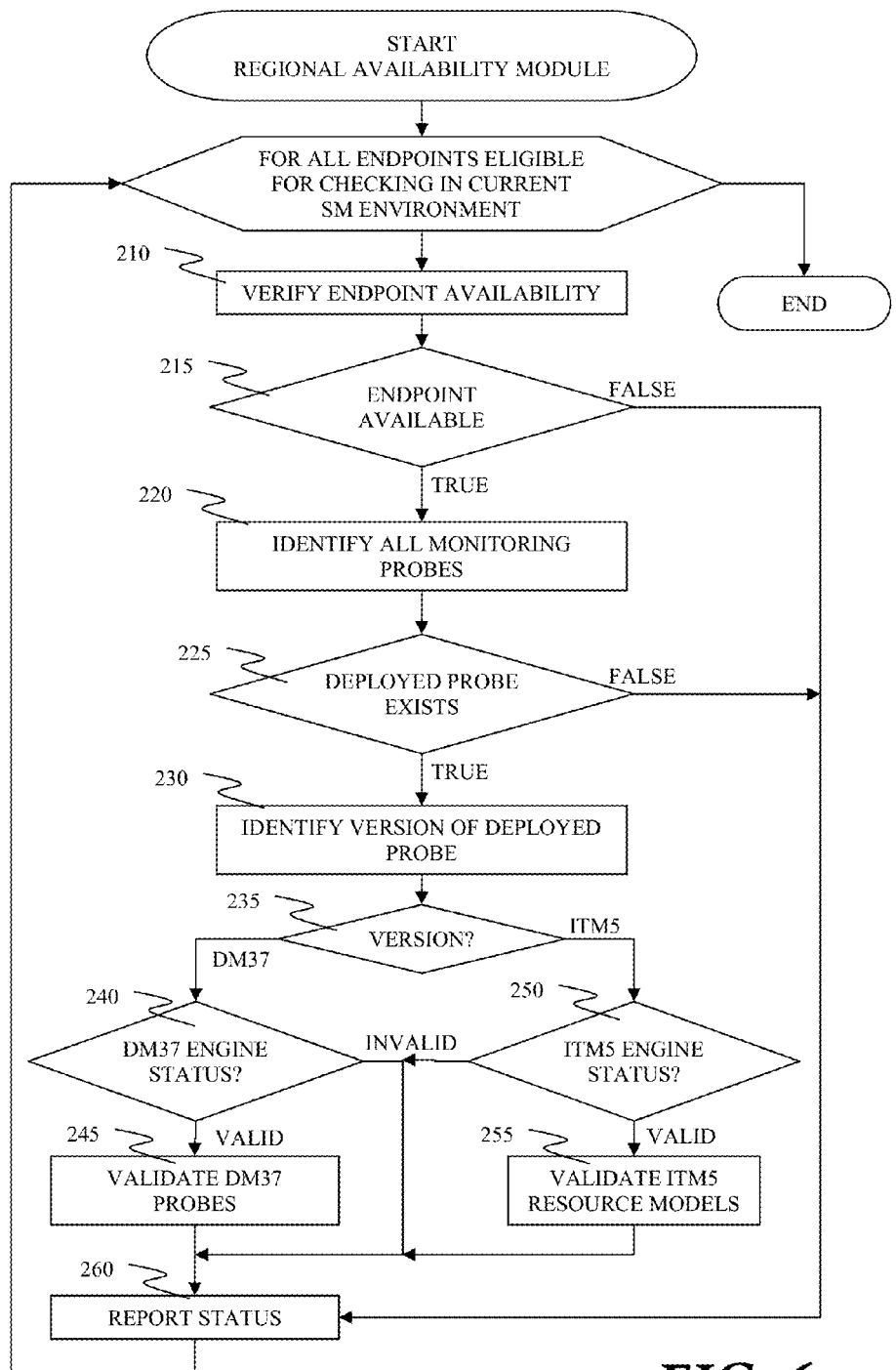
FIG. 6 is a flowchart depicting a method for automatically generating availability data of respective system management environments, which is performed by the regional availability module in the monitoring/management region server of FIG. 3 for a public customer system, in accordance with the embodiments of the present invention.

FIG. 6 is a flowchart depicting a method for automatically generating availability data of respective system management environments, which is performed by the regional availability module in the monitoring/management region server of FIG. 3 supra for a public customer system, in accordance with the embodiments of the present invention.

The regional availability module performs steps 210 through 260 for each endpoint eligible for checking of availability data, for all terminal systems coupled to the monitoring/management region server. The public customer system SM environment comprises various types and respective number of endpoints as described in FIG. 3 supra.

In step 210, the regional availability module verifies availability of a current endpoint. In one embodiment of the present invention, the regional availability module is configured to verify endpoint availability pursuant to a configuration list received from the data collection module during configuration. Then the regional availability module proceeds with step 220.

In step 215, the regional availability module determines whether the current endpoint is running and available pursuant to a result of step 210 supra. If the regional availability module determines that the current endpoint is available, then the regional availability module proceeds with step 220. If the regional availability module determines that the current endpoint is not available, then the regional availability module proceeds with step 260.

In step 220, the regional availability module identifies a type of monitoring probe that is configured for deployment on the current endpoint. Then the regional availability module proceeds with step 225.

In step 225, the regional availability module determines whether a proper monitoring probe is deployed on the current endpoint. If the regional availability module determines that a monitoring probe having a type corresponding to the current endpoint is deployed on the current endpoint, then the regional availability module proceeds with step 230. If the regional availability module determines that there is no monitoring probe deployed on the current endpoint or that a monitoring probe deployed on the current endpoint is of a type not corresponding to the current endpoint, then the regional availability module proceeds with step 260.

In step 230, the regional availability module identifies a respective version of each monitoring probe deployed on the current endpoint. Then the regional availability module proceeds with step 235.

In step 235, the regional availability module determines a version corresponding to a monitoring probe selected for validation. The version may be selected from a group consisting of DM37, ITM5, and any versions of SM environment probes for Tivoli, Patrol, etc. If the regional availability module determines that the version of the monitoring probe is DM37, then the regional availability module proceeds with step 240. If the regional availability module determines that the version of the monitoring probe is ITM5, then the regional availability module proceeds with step 250. For each version of the monitoring probe selected for validation, respective steps to check status of the monitoring probe of said each version and to validate the monitoring probe follow. Such respective steps for other versions of monitoring probes are not illustrated in FIG. 6.

In step 240, the regional availability module checks state of a DM37 engine. If the regional availability module determines that the state of the DM37 engine is valid, then the regional availability module proceeds with step 245. If the regional availability module determines that the state of the DM37 engine is invalid, then the regional availability module proceeds with step 260.

In step 245, the regional availability module validates each DM37 monitoring probe. Then the regional availability module proceeds with step 260.

In steps 240 and 245, the Distributed Monitoring v3.7 (DM37) Engine client software is installed on each endpoint to be monitored directly. The DM37 Engine is responsible to run Distributed Monitoring v3.7 (DM37) monitoring probes, or simply DM37 Probes. The DM37 Engine determines whether or not the DM37 Probes should be triggered, and runs most of the automated responses. The DM37 Probe is responsible to monitor specific types of resources, inter alia, CPU, memory, disk space, communication bandwidth, etc. In one embodiment of the present invention, a respective terminal system runs a Tivoli Endpoint, a DM 37 Engine and one or more DM37 Probes.

In step 250, the regional availability module checks state of an ITM5 engine. If the regional availability module determines that the state of the ITM5 engine is valid, then the regional availability module proceeds with step 255. If the regional availability module determines that the state of the ITM5 engine is invalid, then the regional availability module proceeds with step 260.

In step 255, the regional availability module validates each ITM5 resource model. Then the regional availability module proceeds with step 260.

In steps 250 and 255, the IBM Tivoli Monitoring v5 (ITM5) Engine client software is installed on each endpoint to be directly monitored. The ITM5 Engine is responsible to run ITM5 Resource Models (RM) monitoring probes, or simply ITM5 resource models. The ITM5 Engine determines whether or not the ITM5 resource models should be triggered, and runs most of the automated responses. The ITM5 resource model is responsible to monitor specific types of resources, inter alia, CPU, memory, disk space, communication bandwidth, etc. In one embodiment of the present invention, a respective terminal system runs a Tivoli Endpoint, an ITM5 Engine and one or more ITM5 Resource Models.

In step 260 the regional availability module generates a report stating results of validation/verification steps that performed prior to step 260 for the data collection module. The report comprises one or more results selected from the group consisting of {endpoint available, endpoint unavailable} from step 215, {deployed probe exists, no deployed probe} from step 225, {DM37 Engine valid, DM37 Engine invalid} from step 240, {DM37 Probes validated} from step 245, {ITM5 Engine valid, ITM5 Engine invalid} from step 250, {ITM5 Resource Models validated} from step 255, and combinations thereof. Then the regional availability module loops back to step 210 to process a next endpoint. The regional availability module terminates upon processing all endpoints eligible for checking in the current SM environment.

Figure 7:
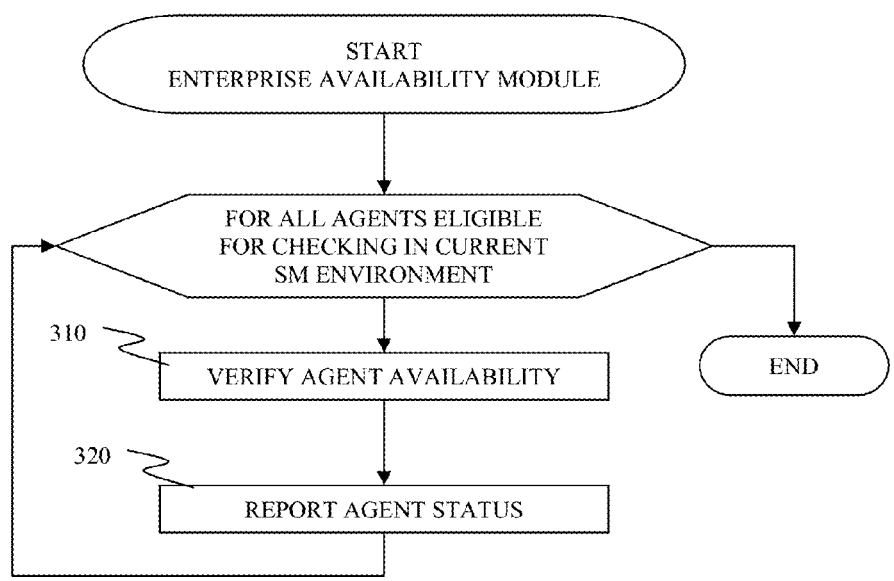
FIG. 7 is a flowchart depicting a method for automatically generating availability data of respective system management environments, which is performed by the enterprise availability module in the monitoring/management enterprise server of FIG. 4 for a private customer system, in accordance with the embodiments of the present invention.

FIG. 7 is a flowchart depicting a method for automatically generating availability data of respective system management environments, which is performed by the enterprise availability module in the monitoring/management enterprise server of FIG. 4 supra, for a private customer system, in accordance with the embodiments of the present invention.

The enterprise availability module performs steps 310 and 320 for each SM agent eligible for checking of availability data, for all terminal systems coupled to the monitoring/management enterprise server. The private customer system SM environment comprises various types and respective number of agents as shown in FIG. 4 supra.

In step 310, the enterprise availability module verifies availability of a current agent. In one embodiment of the present invention, the enterprise availability module is configured to verify agent availability pursuant to a configuration list received from the data collection module during configuration. Then the enterprise availability module proceeds with step 320.

In step 320, the enterprise availability module generates a report stating results of validation/verification steps that performed prior to step 320 for the data collection module. In one embodiment of the present invention, the report generated by step 320 describes status of ITM6.

Figure 8:
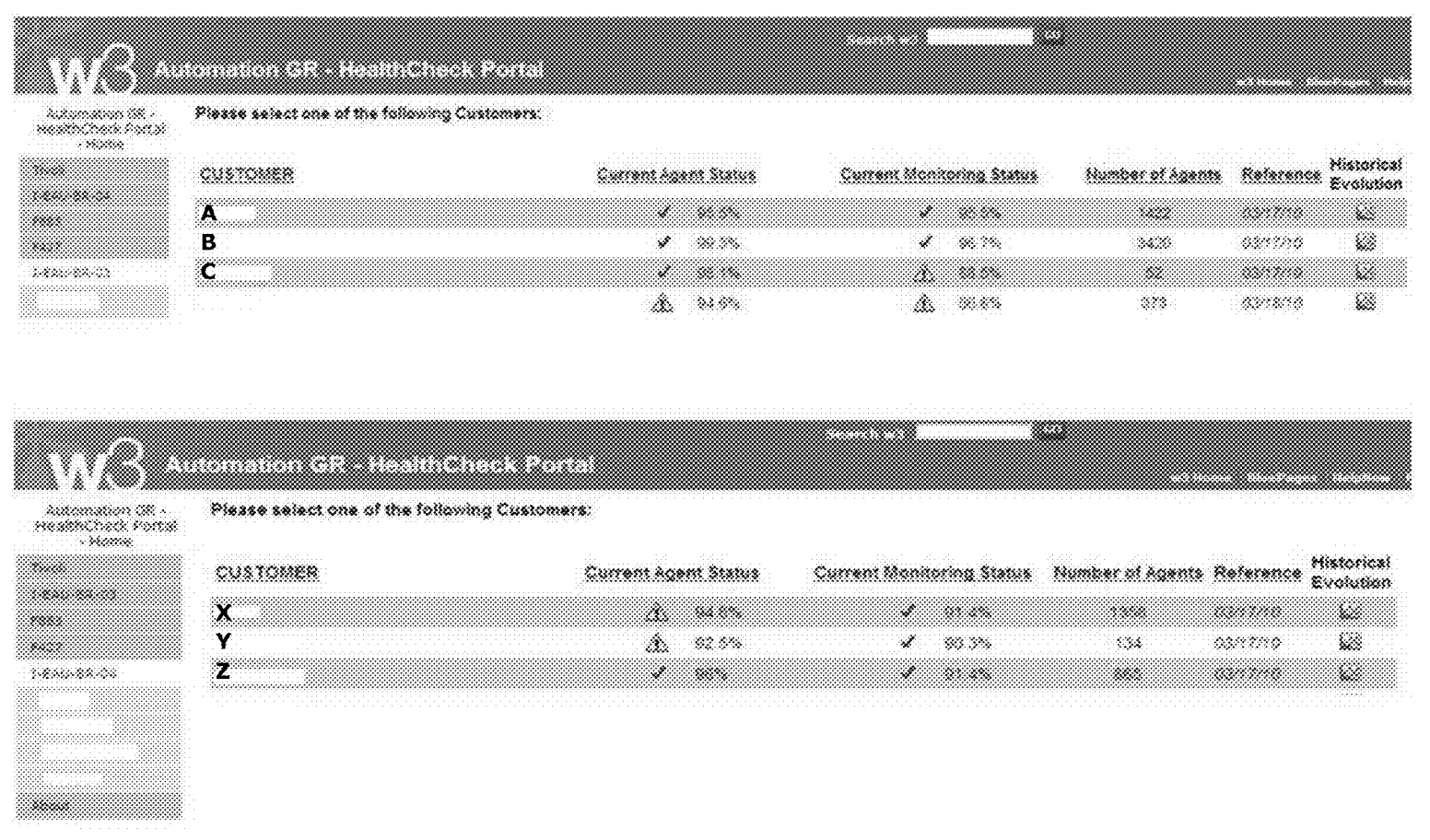

FIG. 8 is an example of a screen display implementing the web-based graphical user interface (GUI) of the system management portal server (SMPS) of FIG. 2 supra, in accordance with embodiments of the present invention.

The example web GUI shows a General Availability Dashboard (GAD), which consolidates user interfaces for numerous SM tools. The GAD displays key data on the SM environments that are monitored by the SMPS. Examples of key data may be, inter alia, overall Agents & Monitors availability, current baselines, historical trends, etc.

In "CUSTOMER" column, the GAD presents, a respective name of a customer/SM environment in which the SM environment of the present invention is installed.

In "Current Agent Status" column, the GAD shows an overall availability of systems automation agents on the respective environment identified in the CUSTOMER column.

In "Current Monitoring Status" column, the GAD shows an overall availability of monitors and probes running on the respective system automation agent.

In "Number of Agents" column, the GAD shows a respective number of systems automation agents on the respective environment identified in the CUSTOMER column.

In "Reference" column, the GAD shows a time when the SM environment identified in the CUSTOMER column has been most recently synchronized with the SMPS.

In "Historical Evolution" column, the GAD shows a hyperlink to a chart describing historical trends of overall availability of the SM environment identified in the CUSTOMER column.

Figure 9:
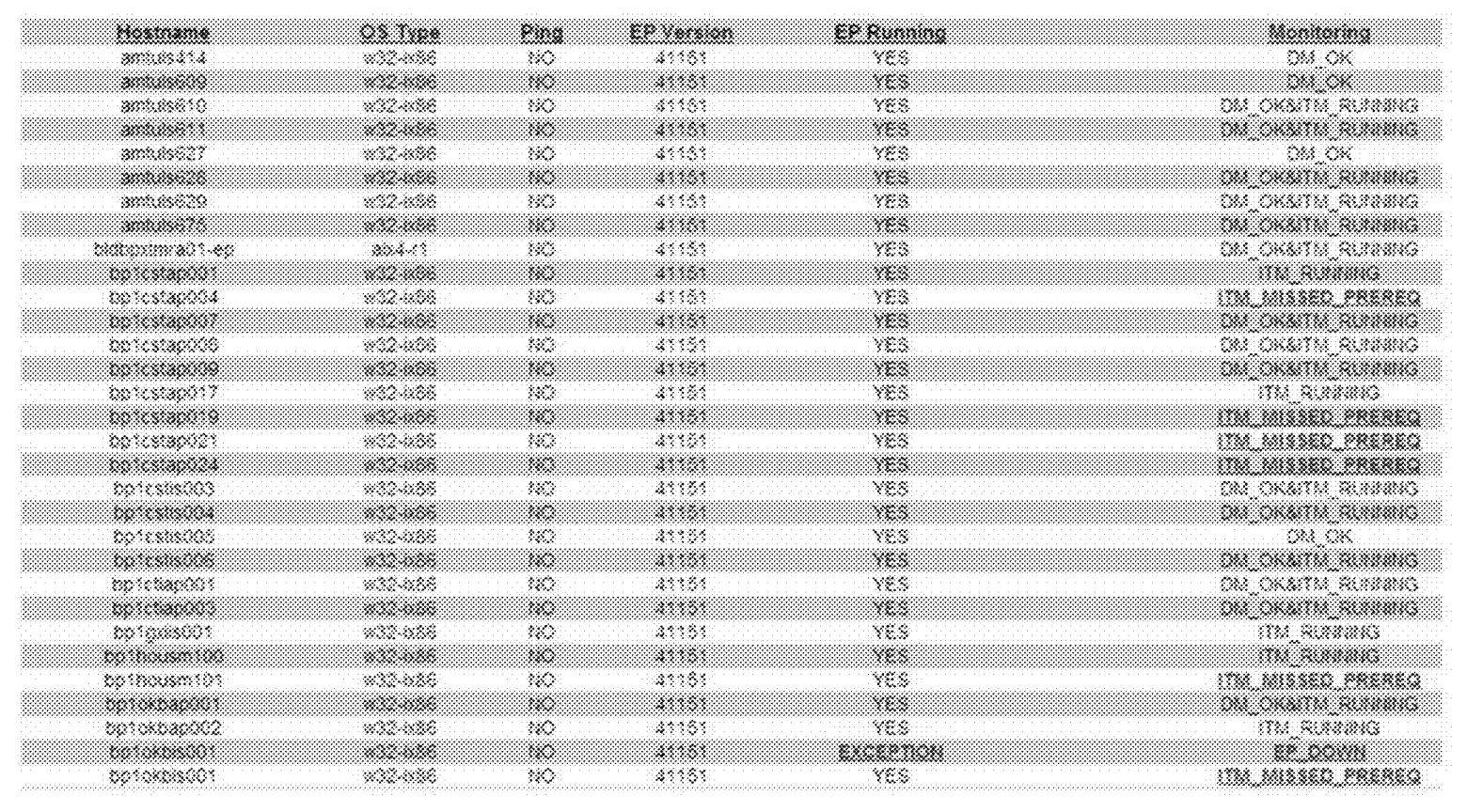

FIG. 9 is an example of a detailed status report generated by the data collection module running in the system management portal server (SMPS) of FIG. 2 supra, in accordance with embodiments of the present invention.

The status report comprises data items collected and stored in steps of FIG. 5 supra, and validation data items reported in step 260 of FIG. 6 supra, or step 320 of FIG. 7 supra. The status report of FIG. 9 is hyperlinked to any one customer name of FIG. 8 supra and presented upon clicking a specific customer name.

Figure 10:
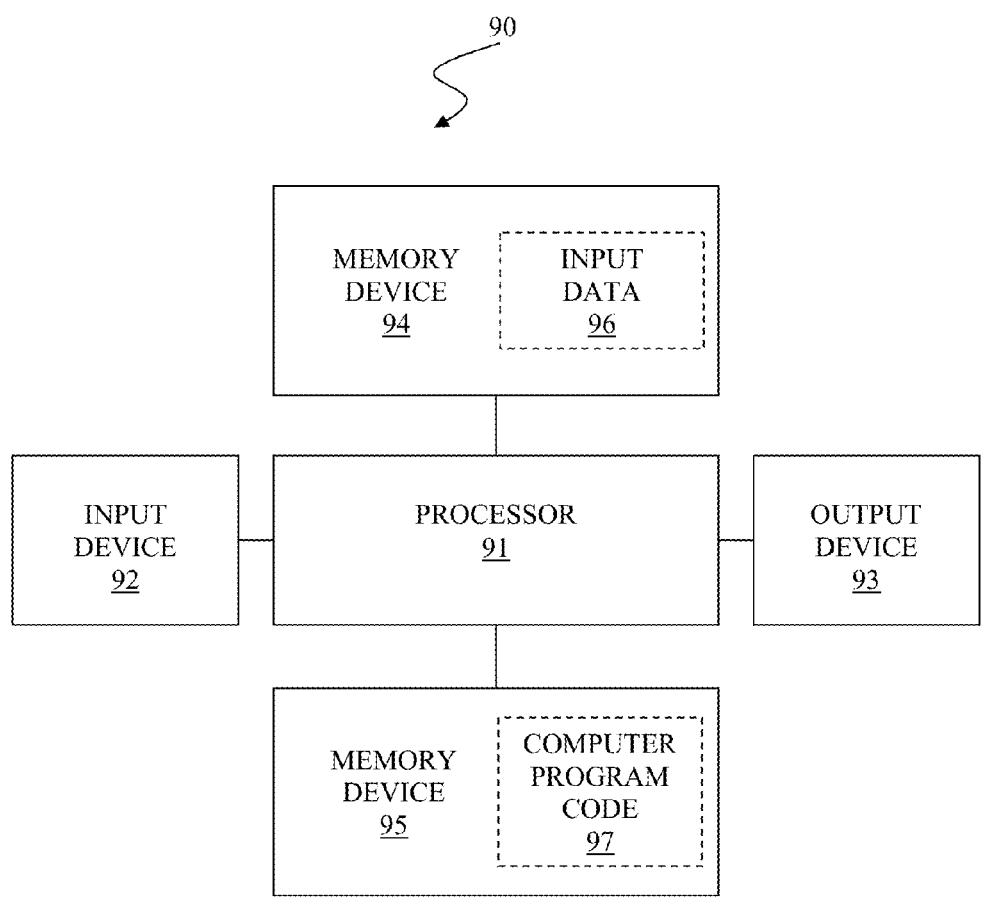
FIG. 10 illustrates a computer system used for automatically monitoring and reporting availability data of respective system management environments, in accordance with the embodiments of the present invention.

FIG. 10 illustrates a computer system used for automatically monitoring and reporting availability data of respective system management environments, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for automatically monitoring and reporting availability data of respective system management environments of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for automatically monitoring and reporting availability data of respective system management environments.

In another embodiment, the invention provides a method that performs the process steps of the invention on a subscription, advertising and/or fee basis. That is, a service provider, such as a Solution Integrator, can offer to create, maintain, support, etc., a process for automatically monitoring and reporting availability data of respective system management environments of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically monitoring and reporting availability data of at least one system management (SM) environment, said method comprising:
   identifying a SM environment of said at least one SM environment that is eligible for data collection, wherein the SM environment is coupled to a SM portal server, wherein the SM portal server comprises a central repository, a user interface, and a data collection module, wherein the SM environment comprises a monitoring server and one or more terminal systems coupled to the monitoring server, and wherein the monitoring server runs an availability module that enables collecting of various system level data from said one or more terminal systems;
   retrieving connection configuration associated with the identified SM environment from the central repository;
   collecting the availability data from the availability module upon determining that the retrieved connection configuration properly establishes communication between the SM portal server and the identified SM environment, wherein the availability data represents availability of resources of said one or more terminal systems;
   recording the collected availability data and a transaction log of said collecting in the central repository; and
   communicating content of the central repository from said recording such that a user of the SM portal server utilizes contents of the central repository in analyzing availability of the resources in the SM environment.

2. The method of claim 1, wherein the SM environment is a public environment that manages said one or more terminal systems based on a respective region associated with each terminal system of said one or more terminal systems, said collecting comprising:
   running the availability module in the monitoring server such that each endpoint of said one or more terminal systems is verified for being available, such that each monitoring probe deployed on said each available endpoint is identified pursuant to a respective version of said each monitoring probe, wherein the respective version of said each monitoring probe is selected from {DM37, ITM5}, such that status of a respective monitoring engine associated with said each identified monitoring probe is validated, such that said each identified monitoring probe associated with the validated respective monitoring engine is subsequently validated, and such that said identified and validated monitoring probes reports respective status of said each monitoring probe to the SM portal server.

3. The method of claim 2, wherein a version of the deployed monitoring probe is "DM37", representing IBM Tivoli Distributed Monitoring version 3.7, wherein said each terminal system runs a IBM Tivoli Endpoint program, said each endpoint runs a DM37 engine client program, wherein the DM37 engine client program runs one or more DM37 monitoring probes, wherein said one or more DM37 monitoring probes monitor a predefined type of resources selected from the group consisting of CPU, memory, disk space, communication bandwidth, and combinations thereof.

4. The method of claim 2, wherein a version of the deployed monitoring probe is "ITM5", representing IBM Tivoli Monitoring version 5, wherein said each terminal system runs a IBM Tivoli Endpoint program, said each endpoint runs a ITM5 engine program, wherein the ITM5 engine runs one or more ITM5 Resource Models, wherein said one or more ITM5 Resource Models monitor a predefined type of resources selected from the group consisting of CPU, memory, disk space, communication bandwidth, and combinations thereof.

5. The method of claim 1, wherein the SM environment is a private environment that manages said one or more terminal systems based on a organization associated with said one or more terminal systems, said collecting comprising:
   running the availability module in the monitoring server such that each agent of said one or more terminal systems is verified for being available, and such that said each verified agent reports respective status of said each agent to the SM portal server.

6. A computer program product comprising:
   a computer readable storage device storing a computer readable program code embodied therein, said computer readable program code containing instructions that perform automatically monitoring and reporting availability data of at least one system management (SM) environment, said monitoring comprising:
   identifying a SM environment of said at least one SM environment that is eligible for data collection, wherein the SM environment is coupled to a SM portal server, wherein the SM portal server comprises a central repository, a user interface, and a data collection module, wherein the SM environment comprises a monitoring server and one or more terminal systems coupled to the monitoring server, and wherein the monitoring server runs an availability module that enables collecting of various system level data from said one or more terminal systems;
   retrieving connection configuration associated with the identified SM environment from the central repository;
   collecting the availability data from the availability module upon determining that the retrieved connection configuration properly establishes communication between the SM portal server and the identified SM environment, wherein the availability data represents availability of resources of said one or more terminal systems;
   recording the collected availability data and a transaction log of said collecting in the central repository; and
   communicating content of the central repository from said recording such that a user of the SM portal server utilizes contents of the central repository in analyzing availability of the resources in the SM environment.

7. The computer program product of claim 6, wherein the SM environment is a public environment that manages said one or more terminal systems based on a respective region associated with each terminal system of said one or more terminal systems, said collecting comprising:

running the availability module in the monitoring server such that each endpoint of said one or more terminal systems is verified for being available, such that each monitoring probe deployed on said each available endpoint is identified pursuant to a respective version of said each monitoring probe, wherein the respective version of said each monitoring probe is selected from {DM37, ITM5}, such that status of a respective monitoring engine associated with said each identified monitoring probe is validated, such that said each identified monitoring probe associated with the validated respective monitoring engine is subsequently validated, and such that said identified and validated monitoring probes reports respective status of said each monitoring probe to the SM portal server.

8. The computer program product of claim 7, wherein a version of the deployed monitoring probe is "DM37", representing IBM Tivoli Distributed Monitoring version 3.7, wherein said each terminal system runs a IBM Tivoli Endpoint program, said each endpoint runs a DM37 engine client program, wherein the DM37 engine client program runs one or more DM37 monitoring probes, wherein said one or more DM37 monitoring probes monitor a predefined type of resources selected from the group consisting of CPU, memory, disk space, communication bandwidth, and combinations thereof.

9. The computer program product of claim 7, wherein a version of the deployed monitoring probe is "ITM5", representing IBM Tivoli Monitoring version 5, wherein said each terminal system runs a IBM Tivoli Endpoint program, said each endpoint runs a ITM5 engine program, wherein the ITM5 engine runs one or more ITM5 Resource Models, wherein said one or more ITM5 Resource Models monitor a predefined type of resources selected from the group consisting of CPU, memory, disk space, communication bandwidth, and combinations thereof.

10. The computer program product of claim 6, wherein the SM environment is a private environment that manages said one or more terminal systems based on a organization associated with said one or more terminal systems, said collecting comprising:

running the availability module in the monitoring server such that each agent of said one or more terminal systems is verified for being available, and such that said each verified agent reports respective status of said each agent to the SM portal server.

11. A computer system comprising a processor, a memory coupled to the processor, and a computer readable storage device coupled to the processor, said storage device containing program code configured to be executed by the processor via the memory to implement a method for automatically monitoring and reporting availability data of at least one system management (SM) environment, said method comprising:

identifying a SM environment of said at least one SM environment that is eligible for data collection, wherein the SM environment is coupled to a SM portal server, wherein the SM portal server comprises a central repository, a user interface, and a data collection module, wherein the SM environment comprises a monitoring server and one or more terminal systems coupled to the monitoring server, and wherein the monitoring server runs an availability module that enables collecting of various system level data from said one or more terminal systems;

retrieving connection configuration associated with the identified SM environment from the central repository;

collecting the availability data from the availability module upon determining that the retrieved connection configuration properly establishes communication between the SM portal server and the identified SM environment, wherein the availability data represents availability of resources of said one or more terminal systems;

recording the collected availability data and a transaction log of said collecting in the central repository; and communicating content of the central repository from said recording such that a user of the SM portal server utilizes contents of the central repository in analyzing availability of the resources in the SM environment.

12. The computer system of claim 11, wherein the SM environment is a public environment that manages said one or more terminal systems based on a respective region associated with each terminal system of said one or more terminal systems, said collecting comprising:

running the availability module in the monitoring server such that each endpoint of said one or more terminal systems is verified for being available, such that each monitoring probe deployed on said each available endpoint is identified pursuant to a respective version of said each monitoring probe, wherein the respective version of said each monitoring probe is selected from {DM37, ITM5}, such that status of a respective monitoring engine associated with said each identified monitoring probe is validated, such that said each identified monitoring probe associated with the validated respective monitoring engine is subsequently validated, and such that said identified and validated monitoring probes reports respective status of said each monitoring probe to the SM portal server.

13. The computer system of claim 12, wherein a version of the deployed monitoring probe is "DM37", representing IBM Tivoli Distributed Monitoring version 3.7, wherein said each terminal system runs a IBM Tivoli Endpoint program, said each endpoint runs a DM37 engine client program, wherein the DM37 engine client program runs one or more DM37 monitoring probes, wherein said one or more DM37 monitoring probes monitor a predefined type of resources selected from the group consisting of CPU, memory, disk space, communication bandwidth, and combinations thereof.

14. The computer system of claim 12, wherein a version of the deployed monitoring probe is "ITM5", representing IBM Tivoli Monitoring version 5, wherein said each terminal system runs a IBM Tivoli Endpoint program, said each endpoint runs a ITM5 engine program, wherein the ITM5 engine runs one or more ITM5 Resource Models, wherein said one or more ITM5 Resource Models monitor a predefined type of resources selected from the group consisting of CPU, memory, disk space, communication bandwidth, and combinations thereof.

15. The computer system of claim 11, wherein the SM environment is a private environment that manages said one or more terminal systems based on a organization associated with said one or more terminal systems, said collecting comprising:

running the availability module in the monitoring server such that each agent of said one or more terminal systems is verified for being available, and such that said each verified agent reports respective status of said each agent to the SM portal server.

16. A process for supporting computer infrastructure, said process comprising providing at least one support service for at least one of creating, integrating, hosting, maintaining, and deploying computer-readable code in a computing system, wherein the code in combination with the computing system is capable of performing a method for automatically monitoring and reporting availability data of at least one system management (SM) environment, said method comprising:

identifying a SM environment of said at least one SM environment that is eligible for data collection, wherein the SM environment is coupled to a SM portal server, wherein the SM portal server comprises a central repository, a user interface, and a data collection module, wherein the SM environment comprises a monitoring server and one or more terminal systems coupled to the monitoring server, and wherein the monitoring server runs an availability module that enables collecting of various system level data from said one or more terminal systems;

retrieving connection configuration associated with the identified SM environment from the central repository;

collecting the availability data from the availability module upon determining that the retrieved connection configuration properly establishes communication between the SM portal server and the identified SM environment, wherein the availability data represents availability of resources of said one or more terminal systems;

recording the collected availability data and a transaction log of said collecting in the central repository; and communicating content of the central repository from said recording such that a user of the SM portal server utilizes contents of the central repository in analyzing availability of the resources in the SM environment.

17. The process of claim 16, wherein the SM environment is a public environment that manages said one or more terminal systems based on a respective region associated with each terminal system of said one or more terminal systems, said collecting comprising:

running the availability module in the monitoring server such that each endpoint of said one or more terminal systems is verified for being available, such that each monitoring probe deployed on said each available endpoint is identified pursuant to a respective version of said each monitoring probe, wherein the respective version of said each monitoring probe is selected from {DM37, ITM5}, such that status of a respective monitoring engine associated with said each identified monitoring probe is validated, such that said each identified monitoring probe associated with the validated respective monitoring engine is subsequently validated, and such that said identified and validated monitoring probes reports respective status of said each monitoring probe to the SM portal server.

18. The process of claim 17, wherein a version of the deployed monitoring probe is "DM37", representing IBM Tivoli Distributed Monitoring version 3.7, wherein said each terminal system runs a IBM Tivoli Endpoint program, said each endpoint runs a DM37 engine client program, wherein the DM37 engine client program runs one or more DM37 monitoring probes, wherein said one or more DM37 monitoring probes monitor a predefined type of resources selected from the group consisting of CPU, memory, disk space, communication bandwidth, and combinations thereof.

19. The process of claim 17, wherein a version of the deployed monitoring probe is "ITM5", representing IBM Tivoli Monitoring version 5, wherein said each terminal system runs a IBM Tivoli Endpoint program, said each endpoint runs a ITM5 engine program, wherein the ITM5 engine runs one or more ITM5 Resource Models, wherein said one or more ITM5 Resource Models monitor a predefined type of resources selected from the group consisting of CPU, memory, disk space, communication bandwidth, and combinations thereof.

20. The process of claim 16, wherein the SM environment is a private environment that manages said one or more terminal systems based on a organization associated with said one or more terminal systems, said collecting comprising:

running the availability module in the monitoring server such that each agent of said one or more terminal systems is verified for being available, and such that said each verified agent reports respective status of said each agent to the SM portal server.

\* \* \* \* \*